(12) United States Patent
Widder et al.

(10) Patent No.: US 9,315,343 B1
(45) Date of Patent: Apr. 19, 2016

(54) ROBOTIC LIFTING APPARATUS

(71) Applicant: Automatan, Inc., Plover, WI (US)

(72) Inventors: Kevin Widder, Sheboygan, WI (US); Daniel Davis, Weston, WI (US); Joseph Clussman, Wisconsin Rapids, WI (US); Daniel Schneider, Waldo, WI (US)

(73) Assignee: Automatan, Inc., Plover, WI (US)

( * ) Notice: Subject to any disclaimer, the term of this patent is extended or adjusted under 35 U.S.C. 154(b) by 43 days.

(21) Appl. No.: 14/268,349

(22) Filed: May 2, 2014

Related U.S. Application Data

(63) Continuation of application No. 13/183,075, filed on Jul. 14, 2011, now Pat. No. 8,777,551.

(51) Int. Cl.
| | | |
|---|---|---|
| *B65G 59/00* | (2006.01) | |
| *B65H 3/24* | (2006.01) | |
| *B65H 1/08* | (2006.01) | |
| *B65H 3/32* | (2006.01) | |
| *B65G 59/02* | (2006.01) | |
| *B27B 31/00* | (2006.01) | |
| *B65H 83/02* | (2006.01) | |

(52) U.S. Cl.
CPC .............. *B65G 59/023* (2013.01); *B27B 31/00* (2013.01); *B65H 1/08* (2013.01); *B65H 3/322* (2013.01); *B65H 83/025* (2013.01); *B65H 2301/4223* (2013.01); *B65H 2301/42242* (2013.01)

(58) Field of Classification Search
CPC .................................. B65G 59/02; B65H 3/32
USPC ........ 294/103.1, 119.1, 3; 414/619, 621, 622, 414/623, 661, 741, 788, 790.2, 791.6, 414/792.7, 795.4, 795.9, 796, 796.1–796.6, 414/796.8, 796.9, 799; 901/34
See application file for complete search history.

(56) References Cited

U.S. PATENT DOCUMENTS

| | | | | |
|---|---|---|---|---|
| 5,042,862 A | * | 8/1991 | Tubke | 294/86.4 |
| 2002/0154986 A1 | * | 10/2002 | Leblanc et al. | 414/795 |
| 2008/0267757 A1 | * | 10/2008 | Benuzzi | 414/751.1 |
| 2009/0263229 A1 | * | 10/2009 | Liebheit | 414/802 |
| 2010/0074720 A1 | * | 3/2010 | Taylor | 414/412 |

FOREIGN PATENT DOCUMENTS

| | | | | |
|---|---|---|---|---|
| EP | 1129843 A1 | * | 9/2001 | B31B 1/74 |
| EP | 1264792 A1 | * | 12/2002 | B65H 3/32 |

* cited by examiner

*Primary Examiner* — Gregory Adams
(74) *Attorney, Agent, or Firm* — Boyle Fredrickson, S.C.

(57) ABSTRACT

An apparatus for separating and moving a selected number of items, such as a sheets, boards or blanks is provided in which a robotic arm is constructed with forks capable of securely compressing a desired number of items therebetween for displacement from a stack of the items. The items to be grasped by the arm are initially separated from the remainder of the stack by a separation mechanism that can be mounted directly to the arm or to a support structure for the stack of items. The separation mechanism engages and lifts the desired number of items from the stack to enable the forks on the arm to engage each side of the items. The apparatus can be quickly reconfigured to engage and remove any desired number of items from the stack and/or to accommodate changes I the shape, size and/or thickness of the items.

17 Claims, 15 Drawing Sheets

ROBOTIC LIFTING APPARATUS

CROSS-REFERENCE TO RELATED APPLICATIONS

This application claims priority as a divisional application from U.S. Non-Provisional application Ser. No. 13/183,075, filed on Jul. 14, 2011, now U.S. Pat. No. 8,777,551, issued Jul. 15, 2014, the entirety of which is hereby expressly incorporated herein by reference.

FIELD OF THE INVENTION

The present disclosure relates to lifting devices, and more particularly to an apparatus for lifting stacks of material or items and moving the items to a desired location with a desired orientation.

BACKGROUND OF THE INVENTION

Materials and items for use in a variety of manufacturing and other processes are often placed in stacks to enable the items to be more economically positioned and utilized within the processes. For example, many items are shipped from their location of origin to an assembly location where the materials or items are combined with other items to form a completed product. In shipping these materials/items, the items are often placed in stacked configurations on pallets or other similar structures in order to ship a number of the items at the same time in an economic manner.

When placed in these stack configurations, on difficulty is removing the desired number of items from the stack for use in the process. This is a particularly difficult problem when the items are very thin and do not provide a significant side profile enabling the items to be easily removed from the stack.

One industry that in which this issue can significantly affect the operation of the overall process is the paper and corrugated industry, which deals with corrugated and non-corrugated cardboard and paperboard blanks that are fed from stacks for further processing of the sheets, blanks or boards. Examples of these types of machines include laminators, labelers, flexo folder gluers, rotary die cutters, flat bed die cutters, specialty folder gluers and machines which cut and/or crease the boards in order to form a blank into an erectable box for use in packaging different types of items.

In the paper and corrugated industry, the issues pertaining to the removal of the cardboard and paperboard sheets applies in both the initial product forming process, where certain numbers of blanks need to be removed from stacks to supply the machines forming the products from the blanks, and downstream processes which may use the formed paper or cardboard products, such as processes where selected number of the formed blanks are needed to supply the machines used to erect the containers from the formed blanks.

To perform this task, both manual and automated machines and methods are currently used to continuously and repeatedly supply the selected number of sheets, blanks or boards to a feeder, which in turn feeds the sheets, blanks or boards into a machine for further processing. Manual and automated methods each have their advantages and disadvantages.

With the manual methods, while the space and costs necessary for employing this method are reasons for employing the method, other considerations such as the safety of the individual moving the sheets, blanks or boards can weigh heavily against it in light of the likelihood of back injuries, muscle sprains and other injuries associated with repetitive moments.

With current automated methods, while the capital cost of the machine utilized is more than manual labor, the long term labor costs are less. However, in methods employing prior art automated machines, the machines have significant issues with regard to the separation of the desired numbers of items from the stack. The issue can be compounded when the machine is tasked with separating sheets, blanks or boards of different thicknesses, as the machine must be able to adjust to the new size of the item to be able to remove the selected number of items from the stack.

Therefore, it is desirable to develop an apparatus and method for removing selected numbers of items from a stack that includes a mechanism for effectively separating the desired number of items from the stack of items, and that has sufficient operational flexibility as a result of the operating system for the apparatus to adjust to varying thicknesses of the items to be displaced by the apparatus.

SUMMARY OF THE INVENTION

According to one aspect of the present disclosure, an apparatus and method for removing a selected number of a stack of sheets, boards or blanks, among others, is provided in which the apparatus includes a separating mechanism for effectively separating the selected number of items to be removed from the stack. The mechanism can be formed as part of a robotic arm utilized to grasp and transport the items from the stack, or can be formed as a separate mechanism. The mechanism positions the stack section to be removed at a location where the robotic arm can effectively remove the selected number of items from the stack.

According to another aspect of the present disclosure, the apparatus includes an operating system capable of adjusting the operation of the separating mechanism and the robotic arm in order to accommodate changes in the thicknesses of the various items being removed from the stack. The system enables the apparatus to alter the positioning of the separating mechanism and the gripping projections of the robotic arm in response to data entered by an operator concerning the thickness and number of items to be removed from the stack. This positioning can be performed through the use of an operating system associated or contained within a control module or system for the apparatus that enables the parameters of operation for the apparatus to be varied as necessary or desired.

Numerous other aspects, features and advantages of the present disclosure will be made apparent from the following detailed description taken together with the drawing figures.

BRIEF DESCRIPTION OF THE DRAWINGS

The drawings illustrate the best mode currently contemplated of practicing the present disclosure.

In the drawings.

DETAILED DESCRIPTION OF THE INVENTION

Figure 1:
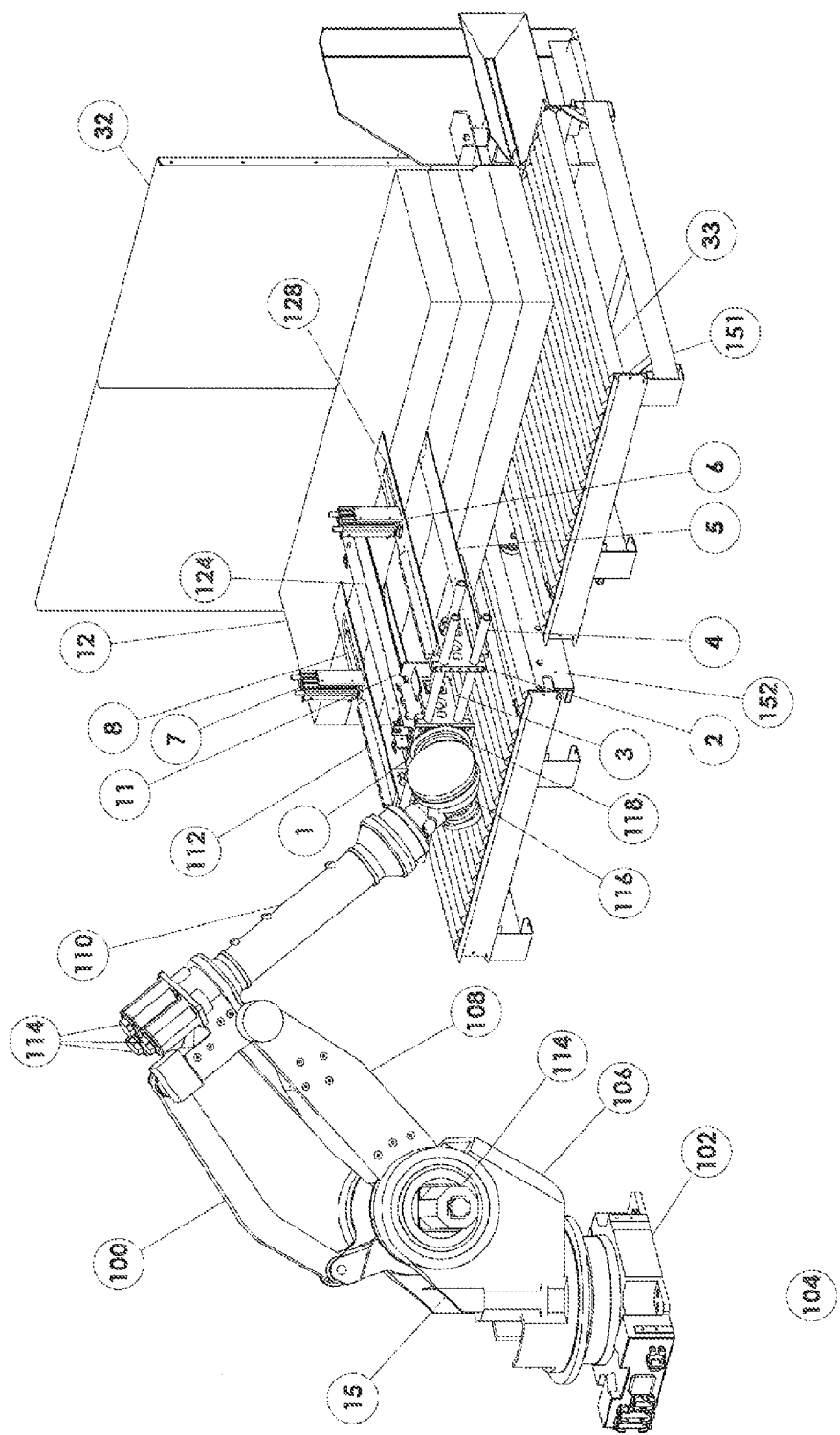
FIG. 1 is an isometric view of a first embodiment of the lifting apparatus and separating mechanism constructed according to the present disclosure in a non-use position.
Figure 12:
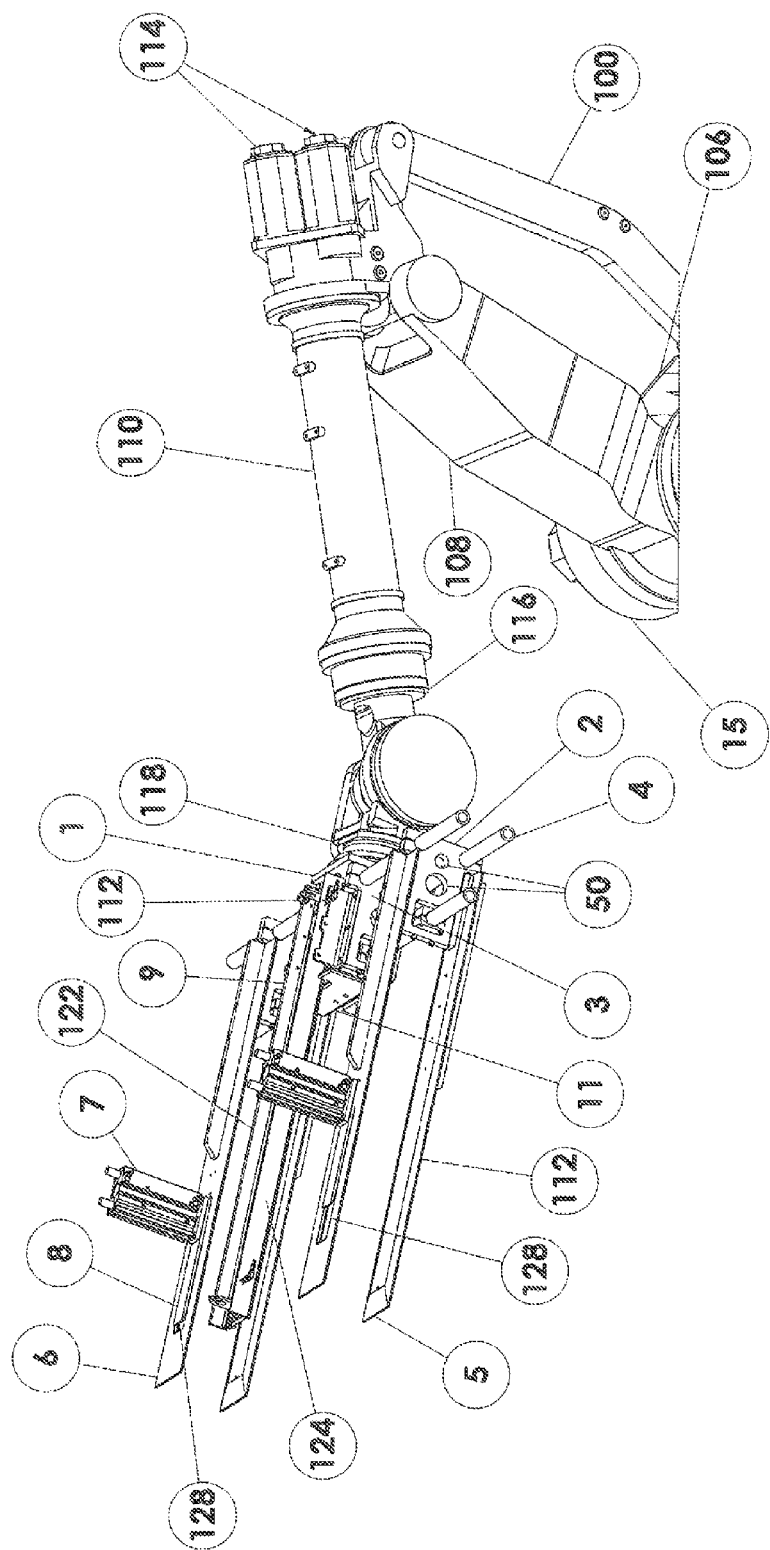
FIG. 12 is a partially broken away isometric view of the apparatus of FIG. 1 with the separating mechanism in a disengaged position.
Figure 13:
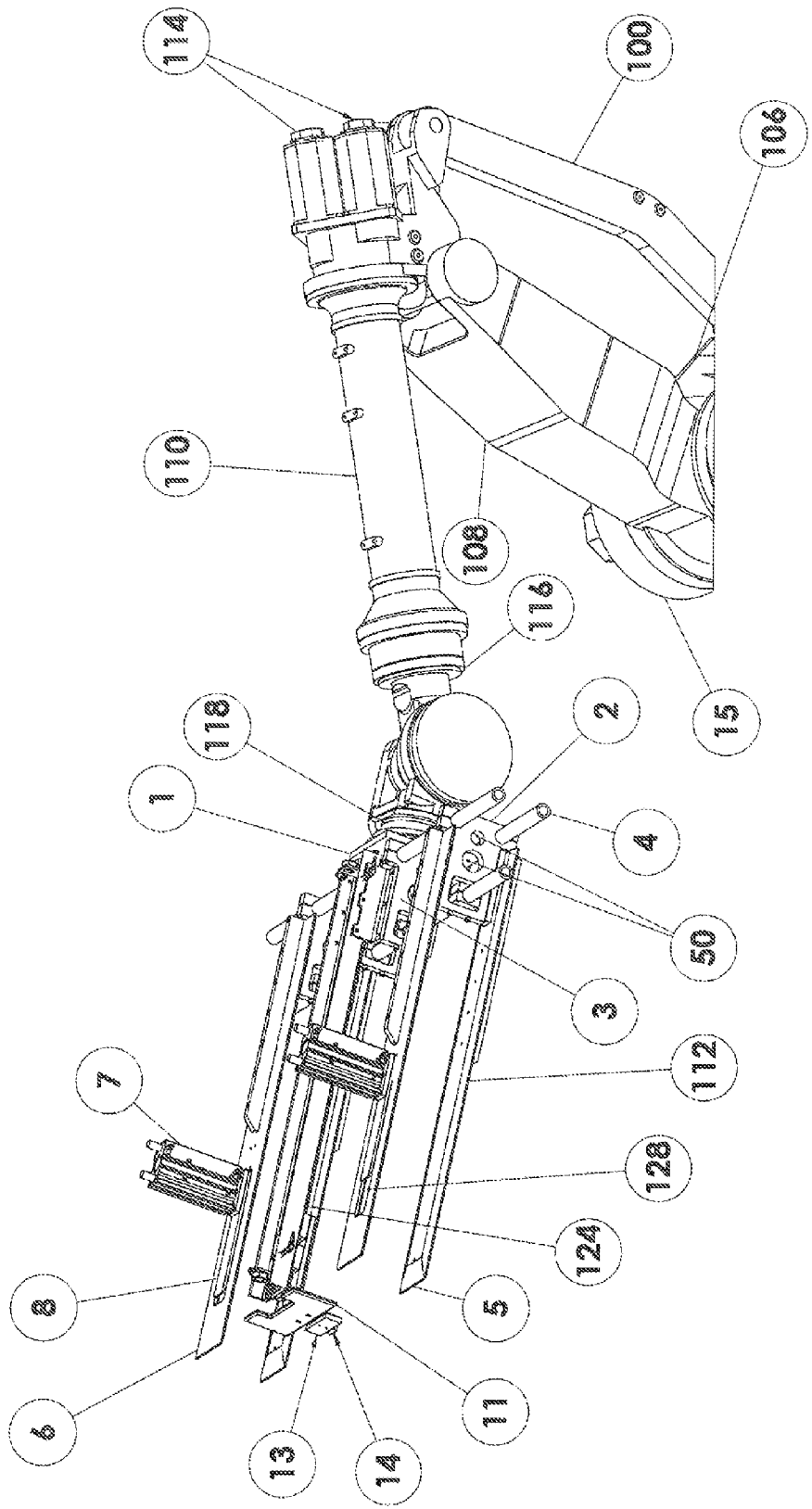
FIG. 13 is a partially broken away isometric view of the apparatus of FIG. 1 with the separating mechanism in an engaged position.

With reference now to the drawing figures in which like reference numerals designate like parts throughout the disclosure, there is illustrated in FIGS. 1, 12 and 13 a robot arm 15 that forms part of a lifting apparatus 100. The robot arm 15 can be formed of any suitable arm utilized to grasp and move various objects, and includes a base 102 secured to a surface, e.g., floor 104, that enable the arm 15 to rotate with respect to the floor 104.

The arm 15 is located adjacent a pair of conveyors 33 disposed on opposed sides of a channel 152. The conveyors 33 are located immediately adjacent a backstop 32 which maintains the alignment of the stacks of items 12 moving along the conveyors 33. The conveyors 33 can be connected to the apparatus 100 for operation therewith, or may form part of a larger conveyance system (not shown) capable of successively moving stacks of items 12 into position over the channel 152, which has a width less than that of the items 12 forming the stack, such that the conveyors 33 effectively support the stack of items 12 on opposite sides of the channel 152.

Connected to the base 102 are a number of pivoting arm sections 106, 108 and 110, that are each pivotally connected to one another and which can be independently moved with respect to one another to position end of arm tooling 112 where desired. The base 102 and sections 106, 108 and 110 can be operated in any suitable manner, such as by employing servomotors 114 that are operably connected to the base 102 and the sections 106, 108, 110.

The end of arm tooling or engagement mechanism 112 is pivotably attached to the end section 110 of the robot arm 15 at pivot 116, and is rotatably attached to the pivot 116 via a rotatable connection 118. Opposite the pivot 116, the end tooling 112 is attached to the rotatable connection 118 by a support plate 1. Connected to the support plate 1 are a pair of support brackets 3. The support brackets 3 extend outwardly from the support plate 1 generally perpendicular to the support plate 1. As best shown in FIGS. 12 and 13, the support brackets 3 each include a number of apertures 50 therein through which perpendicularly extend frame tubes 4. Adjacent each end of the frame tubes 4, the tubes 4 are attached to opposed tube clamp brackets 2, which are formed similarly to the support brackets 3. The position of the brackets 2 on the tubes 4 can be adjusted as necessary in order to vary the width of the end of arm tooling 112 to accommodate the particular items 12 being displaced by the apparatus 100.

The brackets 2 each include a lower fork 5 and an upper fork 6 secured to opposite ends of the brackets 2. The forks 5 and 6 extend outwardly from the brackets 2 in order to enable the forks 5 and 6 to grip a selected number of items 12 therebetween for displacement by the apparatus 100. The distance between the upper forks 6 and the lower forks 5 can be adjusted in a know manner in order to accommodate different numbers and sizes of items 12 to be grasped between the forks 5 and 6.

An air cylinder 7 is attached to each of the upper forks 6 opposite the lower forks 5, and is operably connected to a suitable pneumatic supply (not shown). A board clamp pad 8 is attached to the air cylinder 7 and is positioned within an aperture 128 formed within the upper fork 6. In operation, when the air cylinder 7 is inactive, the clamp pad 8 is positioned within the aperture 128, but above the lower end of the upper fork 6 so as not to interfere with the positioning of the upper fork 6, and the remainder of the end of arm tooling 112 around the section of the stack of items 12 to be engaged by the tooling 112. However, when the selected number of items 12 are in position between the lower forks 5 and upper forks 6, the air cylinder 7 is operated to move the clamp pad 8 downwardly through the aperture 128. The pad 8 is moved through the aperture 128 until the pad 8 contacts and frictionally engages the items 12, effectively clamping the items 12 between the pad 8 and the lower fork 5. Once the items 12 are securely engaged between the pad 8 and the lower fork 5, the tooling 112 and apparatus 100 can be moved to displace the items 12 from the remainder of the stack to a desired location. At that location, the air cylinders 7 can be operated to retract the pads 8 through the apertures 128 in the upper forks 6 releasing the items 12 from between the lower forks 5 and upper forks 6.

The amount of force exerted by the cylinder 7 through the pad 8 on the items 12 can be varied as necessary to accommodate for the desired clamping force to be exerted by simply altering the operation of the air cylinder 7, and without the need for any changes to the tooling 112. The variation can be required by a number of different factors, such as the composition and/or number of items 12 held between the pad 8 and the lower fork 5.

In one of the illustrated embodiments for the apparatus 100, shown in FIGS. 1-5, 12 and 13, to enable the lower forks 5 and upper forks 6 to be positioned on opposite sides of the desired number of items 12 in the stack, the end of arm tooling 112 includes a separation mechanism 120 formed with a separation mechanism or pusher assembly 120. The assembly 120 is mounted between the support brackets 3 and has a guide track 124 extending outwardly from the brackets 3 parallel to the forks 5 and 6. The track 124 supports a rod-less air cylinder 9, which in turn is connected to a pusher plate 11, such as by a carriage 10, that extends downwardly from the cylinder 9 and track 124. The cylinder 9 is operated by a pneumatic supply (not shown) operably connected to the cylinder 9 to move the carriage 10 along the track 124 in order to position the carriage 10 and pusher plate 11 where necessary to interact with, or to avoid interaction with the items 12. To assist in the interaction of the pusher plate 11 with the stack of items 12, the plate 11 includes a downwardly extending lower section 13 having an outwardly extending projection 14 thereon. The projection 14 is shaped to slide between adjacent items 12, in order to initiate the separation of the lowermost item 12 of the predetermined number of items 12 to be removed from the stack, and those above the lowermost item 12, from the stack. The projection 14, in one embodiment, is positioned slightly above the level of the lower forks 5 to facilitate the ability of the lower forks 5 to be positioned beneath the items 12 to be displaced, and can have an outwardly tapered shape in order to enable the projection 14 to more easily be positioned between the items 12. In addition, the lower section 13 can be mounted to the pusher plate 11 to be stationary with respect to the plate 11, or can be pivotally mounted thereto to enable the projection 14 to be moved into engagement with the items 12 by the movement of the lower section 13.

Figure 2:
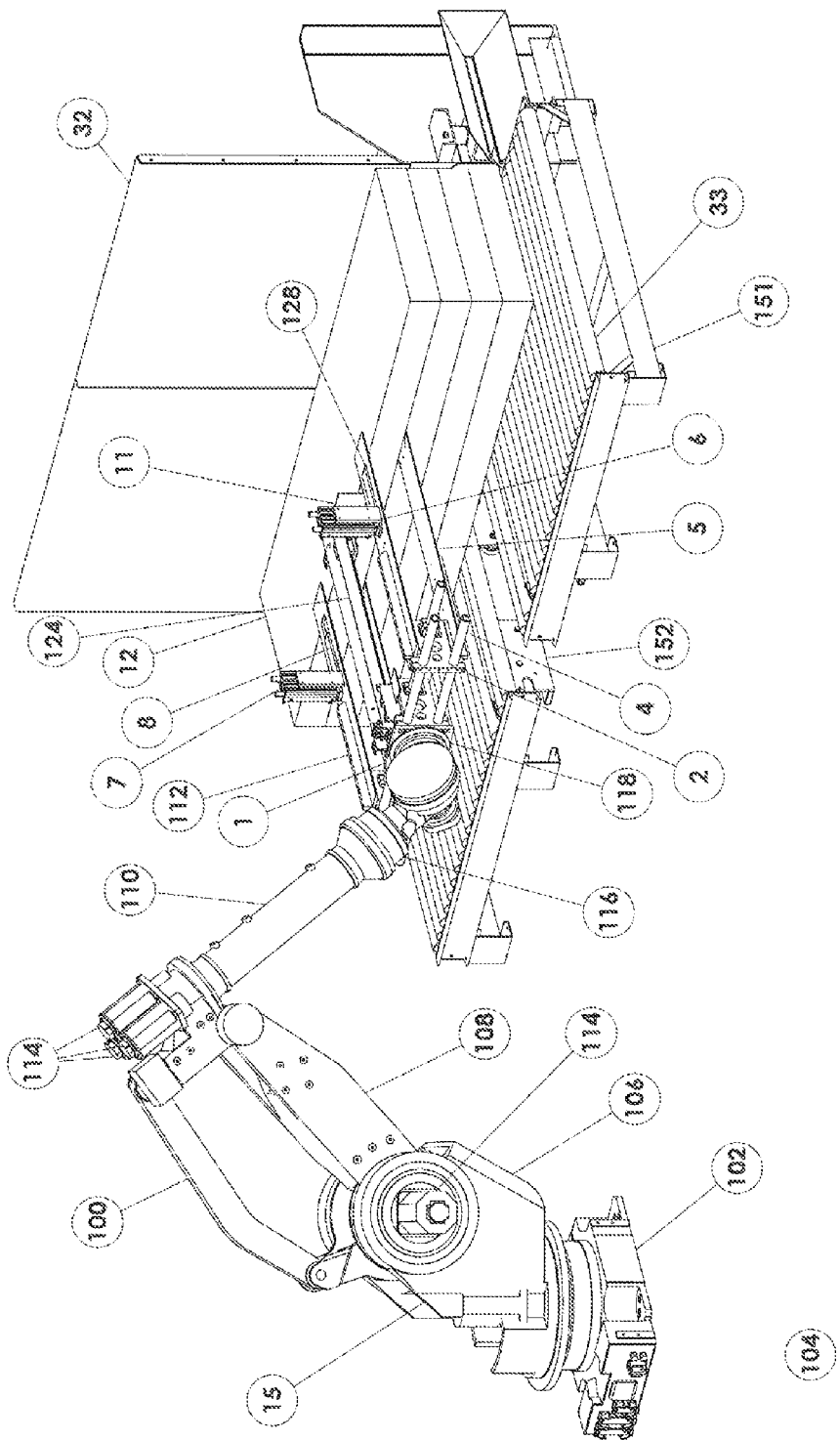
FIG. 2 is an isometric view of the lifting apparatus of FIG. 1 with the separating mechanism engaged with a stack section.

In operation, the apparatus 100 initially is operated to position the tooling adjacent the stack of items 12, as shown in FIG. 1, with the pusher plate 11 in the retracted or disengaged position on the track 124. Subsequently, the cylinder 9 is operated to move the carriage 10 and plate 11 along the track 124 in order to position the pusher plate 11 and projection 14 immediately adjacent the stack of items 12 at the level of the predetermined section or number of items 12 to be displaced from the stack. In this position, as shown in FIG. 2, the pusher plate 11 is disposed beyond the forward end of the lower and upper forks 5, 6. The plate 11 is then moved by the cylinder 9 into engagement with the items 12 in the stack, such that the projection 14 is inserted between adjacent items 12 in the stack, and the plate 11 frictionally engages and compresses the items 12 above the projection 14. The alignment of the items 12 in the stack and the plate 11 is maintained by the backstop 32 which prevents the items 12 engaged by the plate 11 from moving with regard to the other items 12 in the stack.

Figure 3:
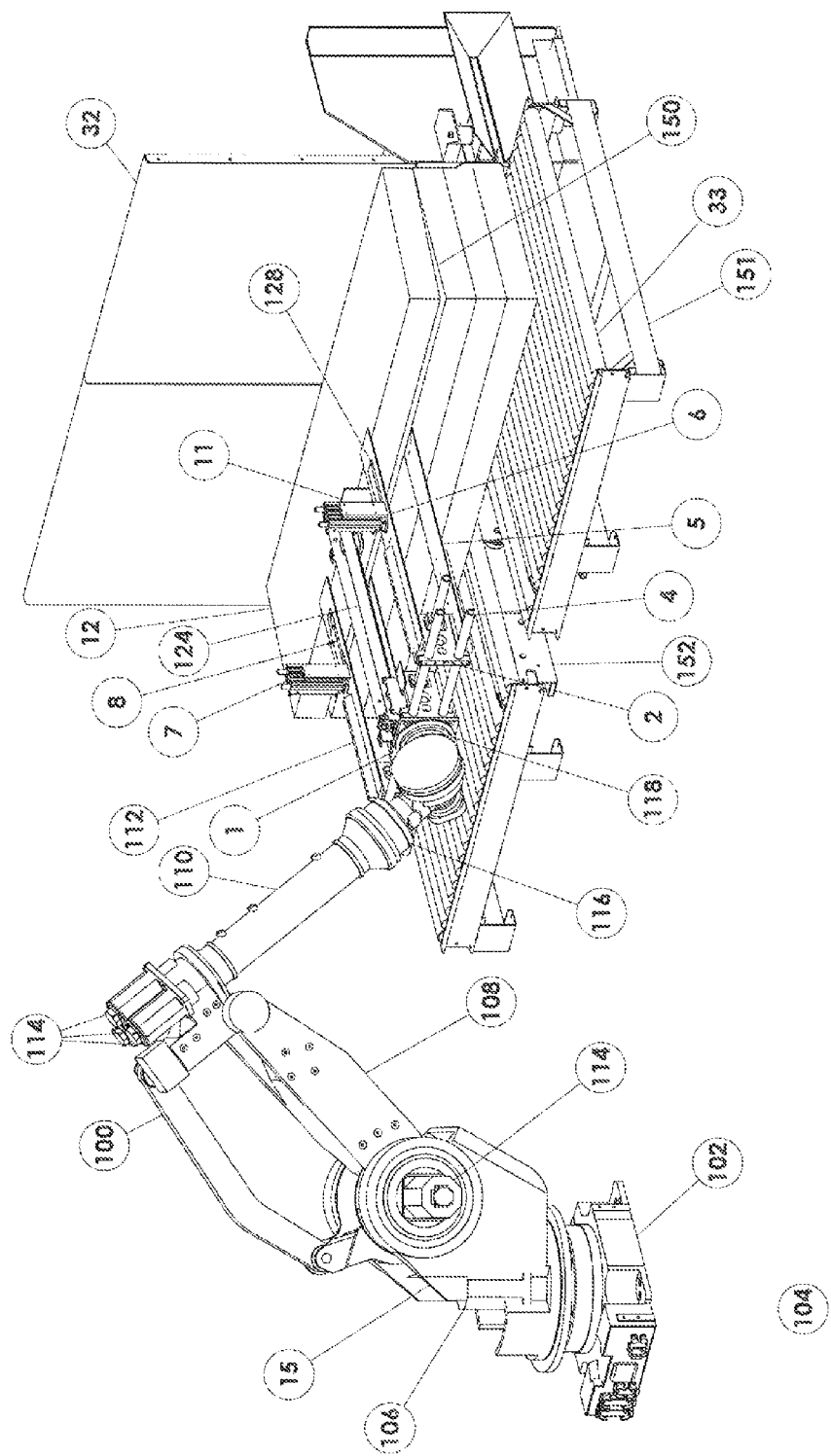
FIG. 3 is an isometric view of the lifting apparatus and separating mechanism of FIG. 1 separating the stack section.
Figure 4:
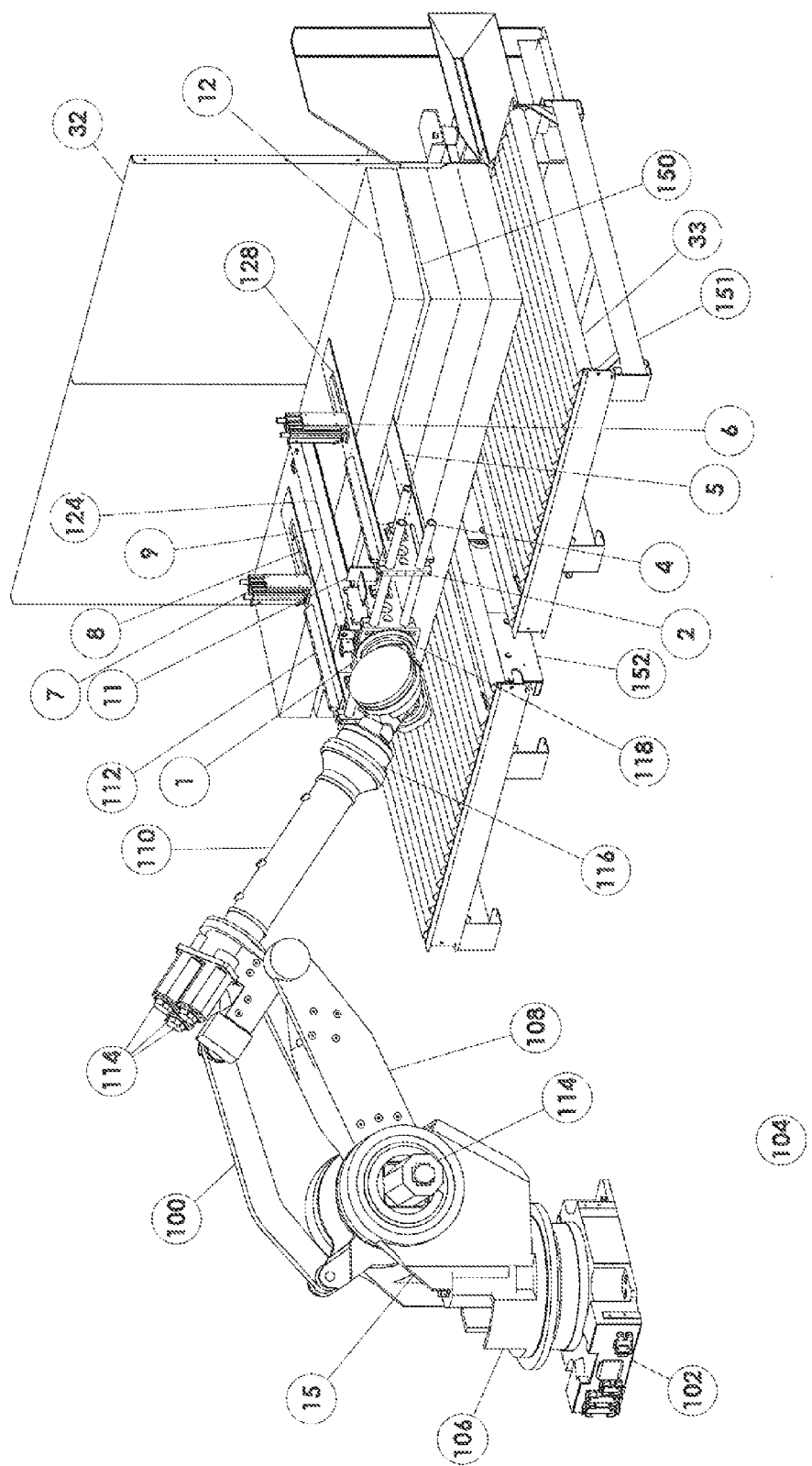
FIG. 4 is an isometric view of the lifting apparatus of FIG. 1 engaged with the stack section, and the separating mechanism disengaged from the stack section.
Figure 5:
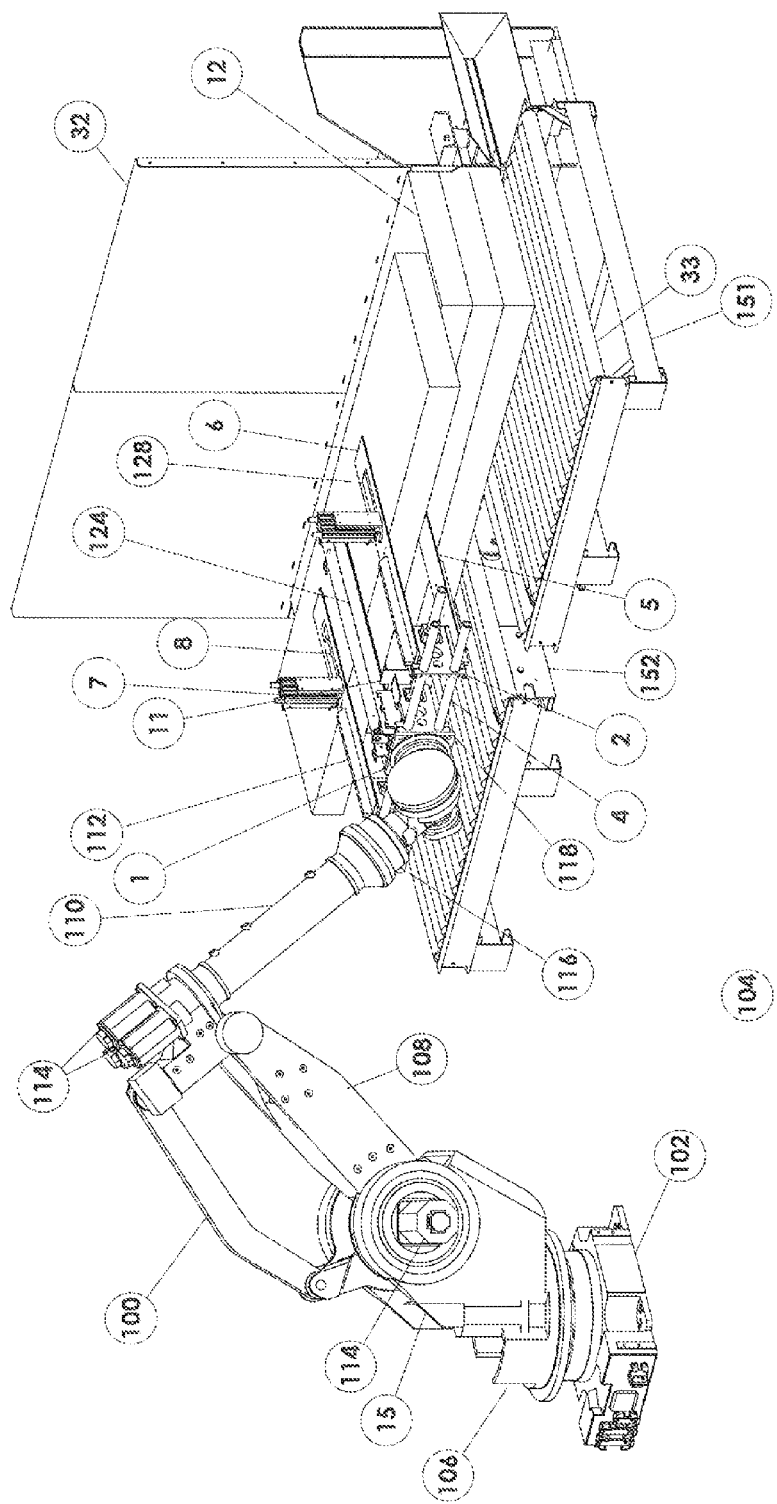
FIG. 5 is an isometric view of the lifting apparatus moving the stack section away from the stack.

While the plate 11 and projection 14 are engaged with the items 12, the tooling 112 is moved upwardly by the arm 15 into the position of FIG. 3, creating a separation or gap 150 between the section of items 12 to be removed and the remainder of the stack. From this position, the cylinder 9 is operated simultaneously with the arm 15 in order to retract the plate 11 and projection 14 from the items 12, while moving the forks 5 and 6 forward around the items 12, as shown in FIG. 4. Once the forks 5 and 6 are located in the proper positions on either side of the items 12, the cylinder 7 can be operated to move the pads 8 into engagement with the items 12, thereby compressing the items 12 between the pads 8 and the lower forks 5. The tooling 112 and arm 15 can then moved as desired to displace the items 12 from the stack and move the items 12 to the desired location, as illustrated in FIG. 5, such as to a board feeder machine (not shown), or the like.

In a second embodiment for the apparatus 100', as shown in FIGS. 6-11, 14 and 15, the separation mechanism 120' is removed from the tooling 112', and is instead formed as a part of the item stack support structure 151. In the illustrated embodiment, the structure 151 includes a pair of conveyors 33 disposed on opposed sides of a channel 152. The conveyors 33 are located immediately adjacent a backstop 32 which maintains the alignment of the stacks of items 12 moving along the conveyors 33. The conveyors 33 can be connected to, or may form part of a larger conveyance system (not shown) capable of successively moving stacks of items 12 into position over the channel 152, which has a width less than that of the items 12 forming the stack, such that the conveyors 33 effectively support the stack of items 12 on opposite sides of the channel 152.

Figure 14:
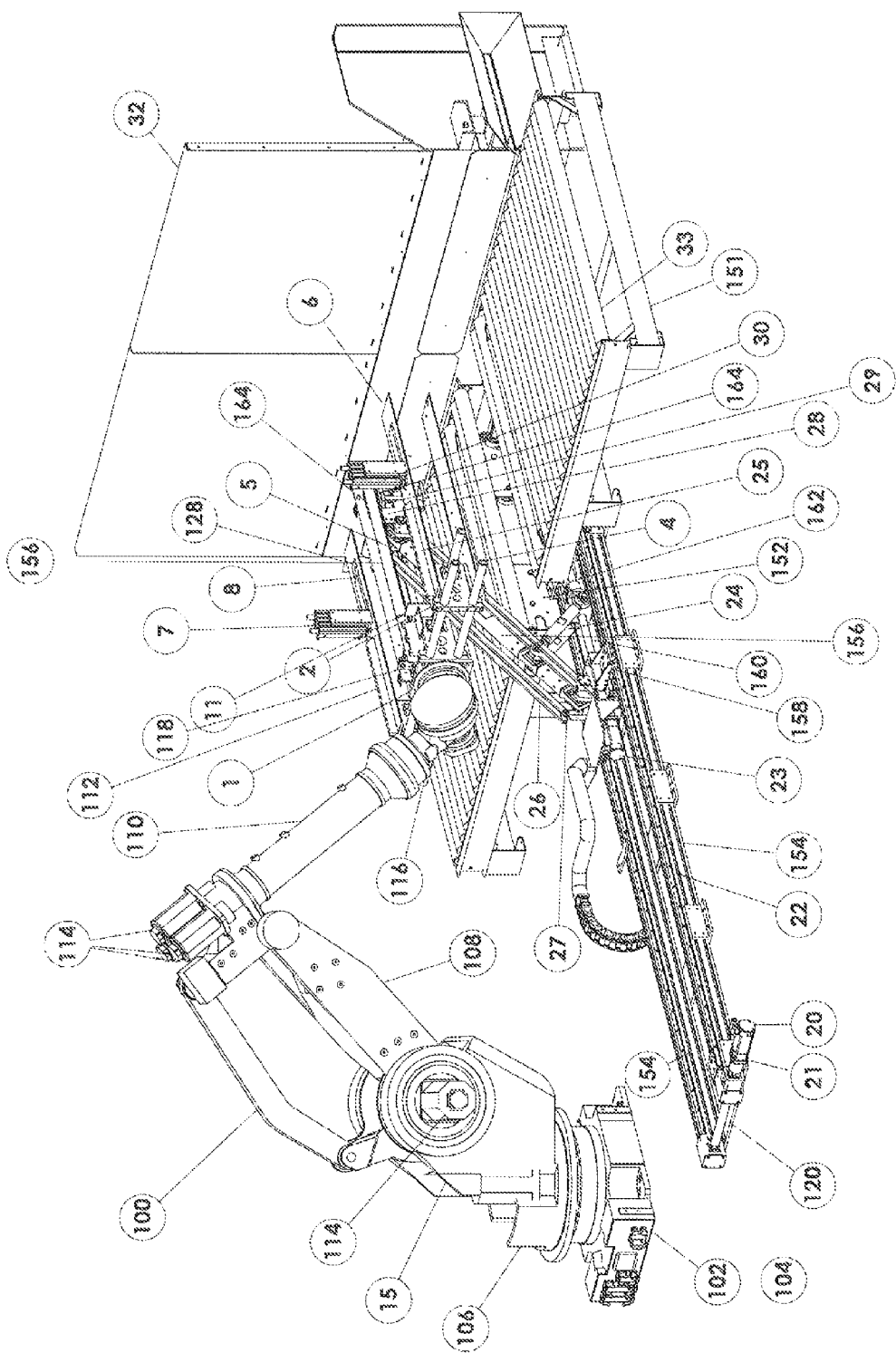
FIG. 14 is an isometric view of the apparatus of FIG. 6 with the separating mechanism in an engaged position.
Figure 15:
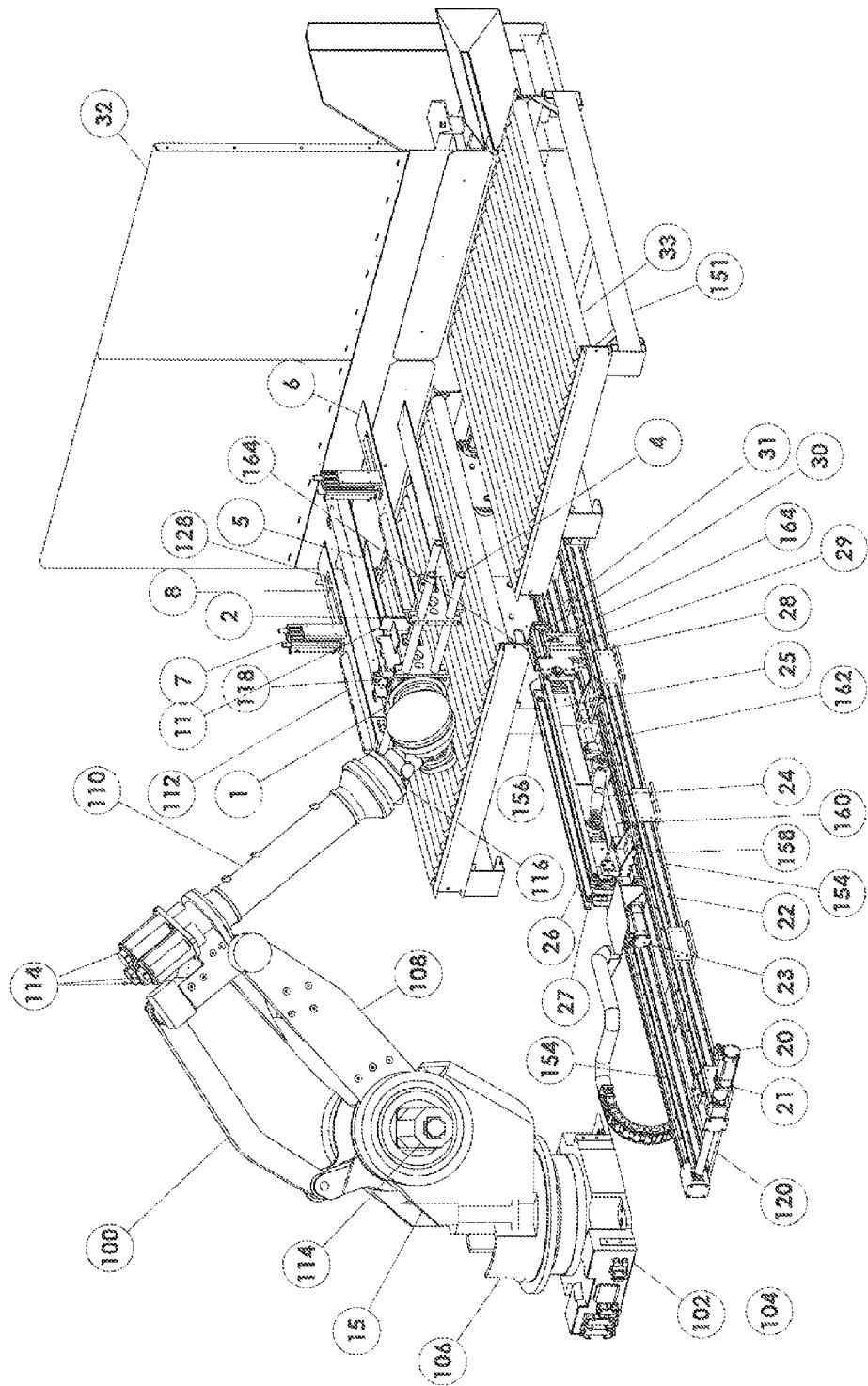
FIG. 15 is an isometric view of the apparatus of FIG. 6 with the separating mechanism in a fully disengaged position.

Referring now to FIGS. 14 and 15, the separation mechanism 120' is disposed in alignment with the channel 152 and includes a pair of frame members 154 each secured to one of the conveyors 33 on each side of the channel 152. The frame members 154 define a track 22 for the movement of a separator arm 156 therealong. The arm 156 is formed with a carriage 158 mounted between the frame members 154 and moveable along the track in response to the operation of a motor 20 operably connected to the carriage 158, such as via a chain drive 21.

The carriage 158 supports a separator boom 25 thereon. The boom 25 is pivotally connected at one end to the carriage 158, and is pivotally secured to one end of a linkage bar 24, which is also pivotally mounted at its opposite end to the carriage 158 at a location spaced from the boom 25. The linkage bar 24 is operably connected to a motor 23 mounted to the carriage 158 in order to pivot the linkage bar 24 with respect to the carriage 158, and consequently to pivot the boom 25 with respect to the carriage 158. In one embodiment the connection between the motor 23 and the linkage bar 24 is made by a ball screw 160 that is connected to and rotatable by the motor 23, and a ball nut 162 connected to the screw 160 and to the linkage bar 24. Thus, when the motor 23 is operated to rotate the screw 160, the screw 160 displaces the nut 162 which consequently pivots the linkage bar 24 with respect to the carriage 158. This, in turn, pivots the boom with regard to the carriage 158 to raise and lower the boom 25 with respect to the carriage 158.

The separator arm 156 also includes a pair of linkage members 26 positioned parallel to the boom 25 and pivotally secured to the carriage 158 at a location on the carriage 158 adjacent the boom 25. Opposite the carriage 158, both the boom 25 and the linkage member 26 are pivotally connected via pivots 27 to a pair of support plates 28. In the illustrated embodiment, each of the linkage members 26 are connected to one plate 28 by separate pivots 27, while the boom 25 is connected between and to each of the plates 28 by a pivot 27, thereby creating a four point connection between the boom 25 and linkage members 26 and the plates 28. With this arrangement, the plates 28 can remain parallel to the surface 104 on which the apparatus 100 and conveyors 33 are positioned, and to the stack of items 12, regardless of the angle at which the boom 25 and linkage members 26 are positioned.

Between the plates 28 is mounted a vertical air cylinder 29 operably connected to a suitable pneumatic supply (not shown) and to a housing 164. The cylinder 29, when operated, serves to vertically displace the housing 164 with respect to the plates 28. Within the housing 164 is disposed a horizontal air cylinder 30 operably connected to the pneumatic supply and to a separator plate 31. The cylinder 30, when operated, serves to horizontally displace the plate 31 with respect to the housing 164.

The separator plate 31 is formed similarly to the pusher plate 11 in the previous embodiment, in order to effectively compress and/or engage the items 12 in the stack supported by the conveyors 33.

Figure 6:
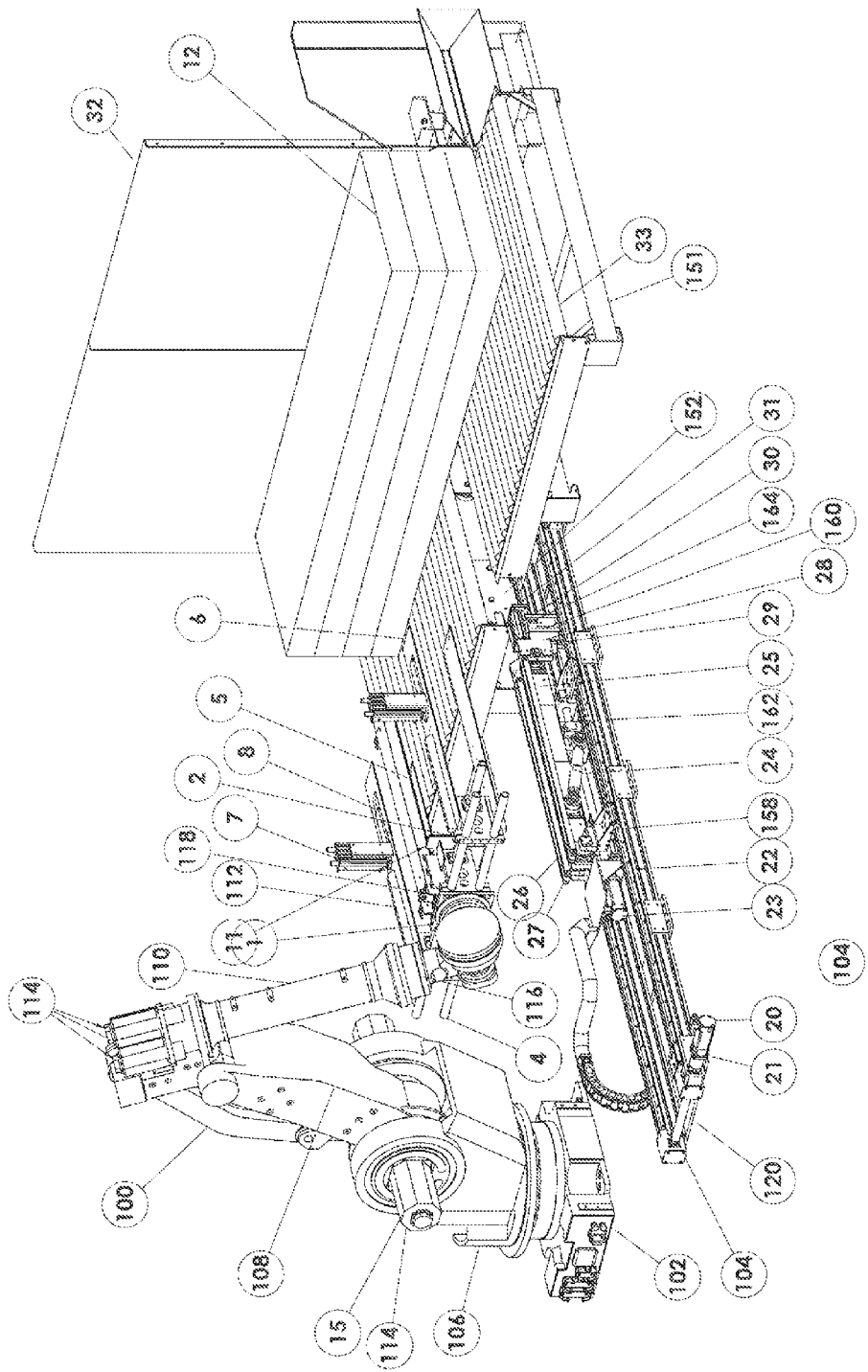
FIG. 6 is an isometric view of a second embodiment of the lifting apparatus and separating mechanism of the present disclosure.
Figure 7:
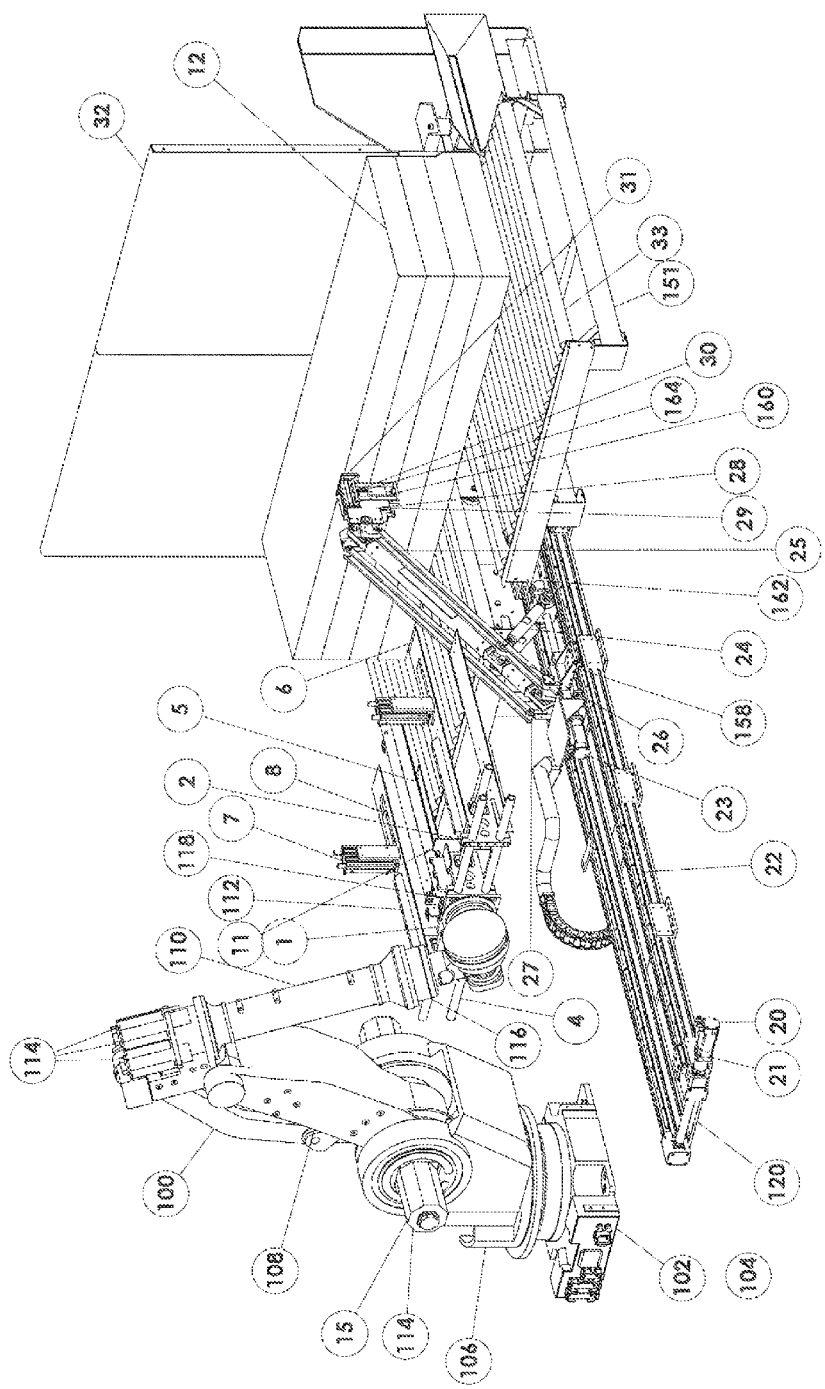
FIG. 7 is an isometric view of the lifting apparatus of FIG. 6 with the separating mechanism engaged with a stack section.
Figure 8:
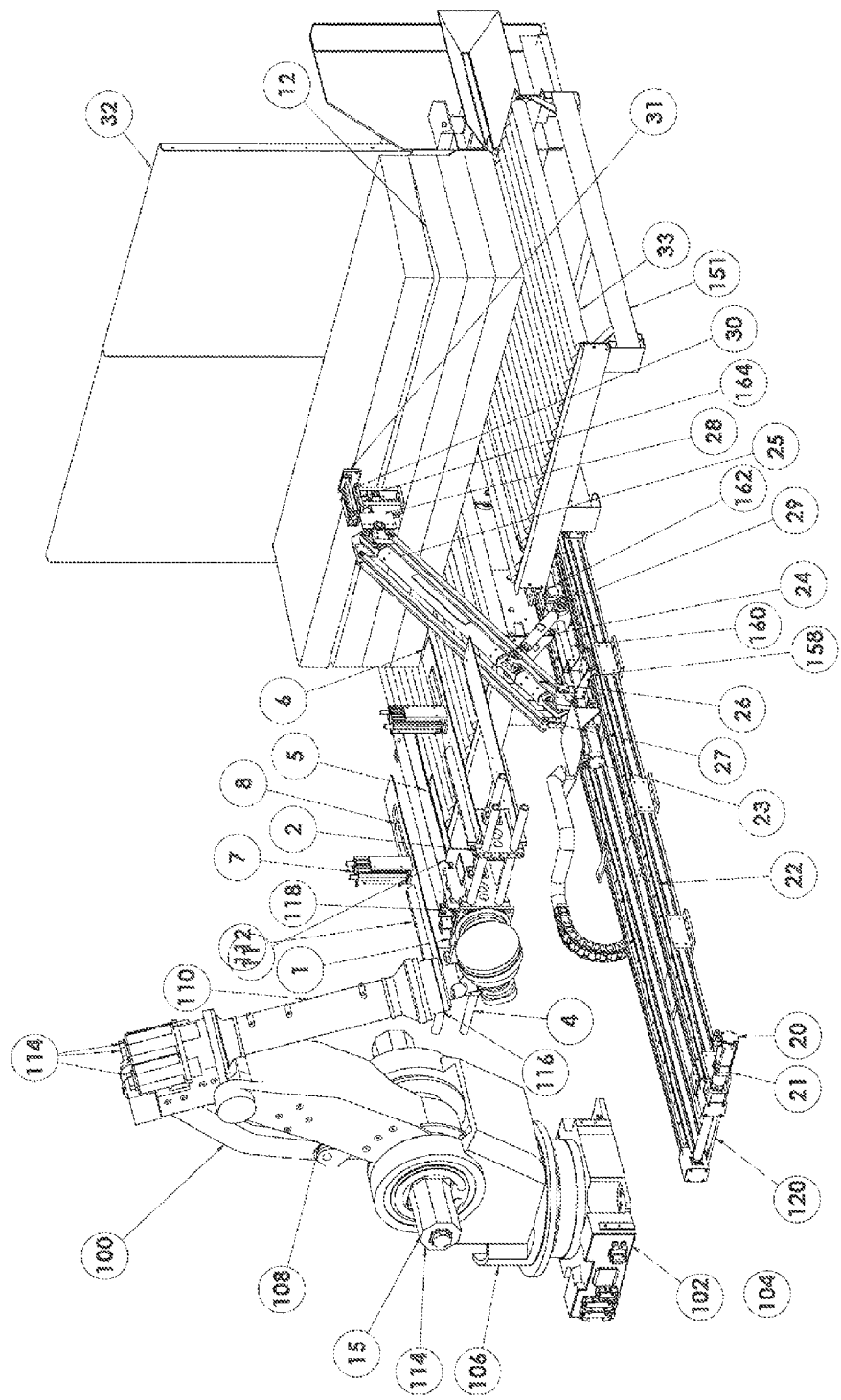
FIG. 8 is an isometric view of the lifting apparatus and separating mechanism of FIG. 6 separating the stack section.

Looking now at FIGS. 6-11, in operation, initially the separator mechanism 120' is in the position illustrated in FIG. 6 with the boom 25 positioned parallel to the track 22. In this location the mechanism 120' does not interfere with the movement of the arm 15 as it positions the tooling 112' and the forks 5 and 6 adjacent the stack of items 12 on the conveyors 33. After the forks 5 and 6 are in position, the motor 20 is operated to move the carriage 158 and boom 25 into the proper position with regard to the stack of items 12. This position can vary depending upon the size and shape of the items 12. Once in the proper location, the motor 23 is activated to raise the boom 25 and housing 160 out of the channel 125 to the appropriate level with respect to the stack of items 12, as shown in FIG. 7. The motor 20 is then operated again to move the carriage 158 and boom 25 to position the housing 160 immediately adjacent the stack of items 12, as shown in FIG. 8. From this position, the cylinder 30 is operated to frictionally engage the separator plate 31 with the stack of items 12. The alignment of the items 12 in the stack and the plate 31 is maintained by the backstop 32 which prevents the items 12 engaged by the plate 31 from moving with regard to the other items 12 in the stack.

Figure 9:
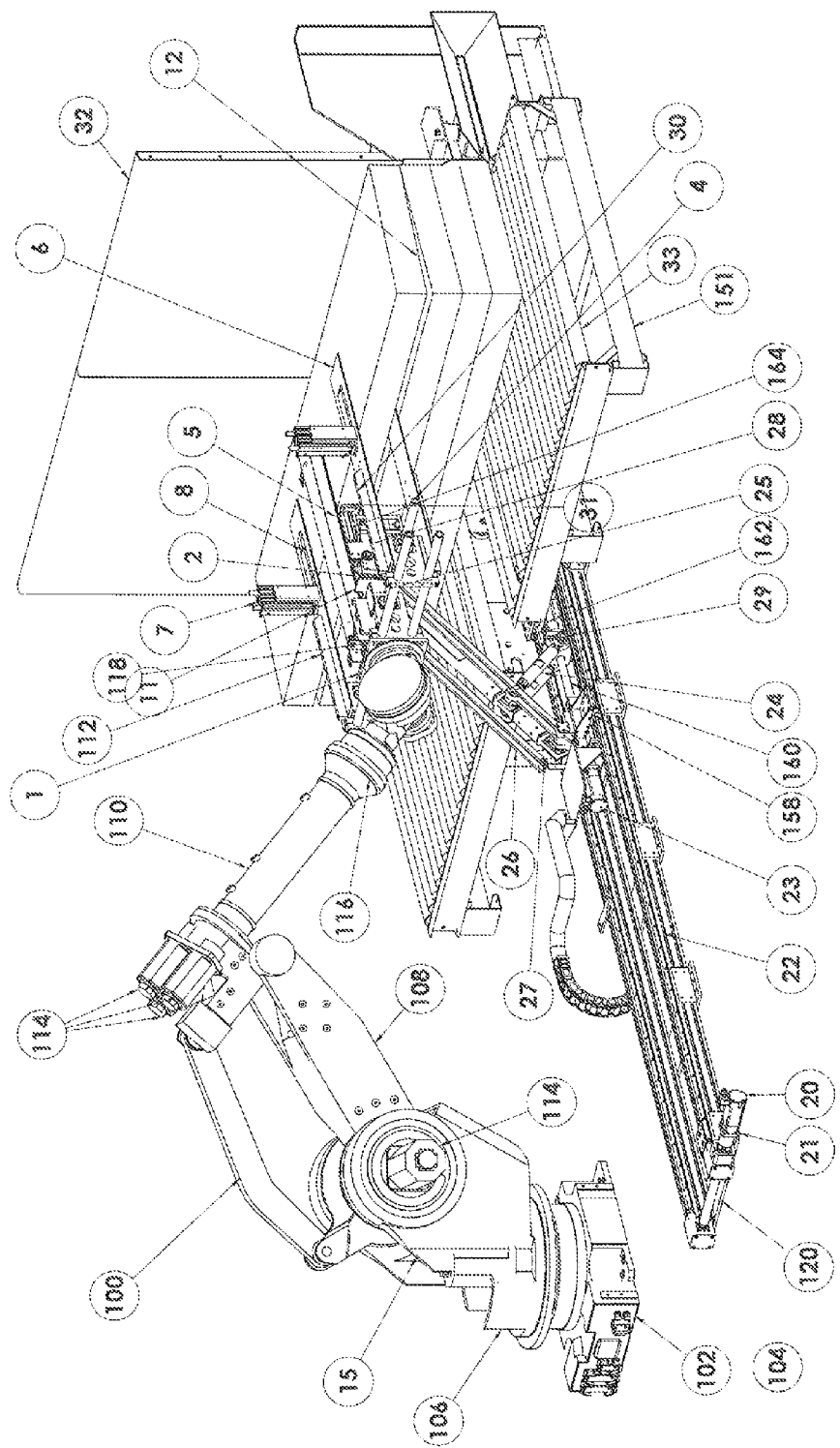
FIG. 9 is an isometric view of the lifting apparatus of FIG. 6 inserted between the stack section and the stack, and the separating mechanism disengaged from the stack section.
Figure 10:
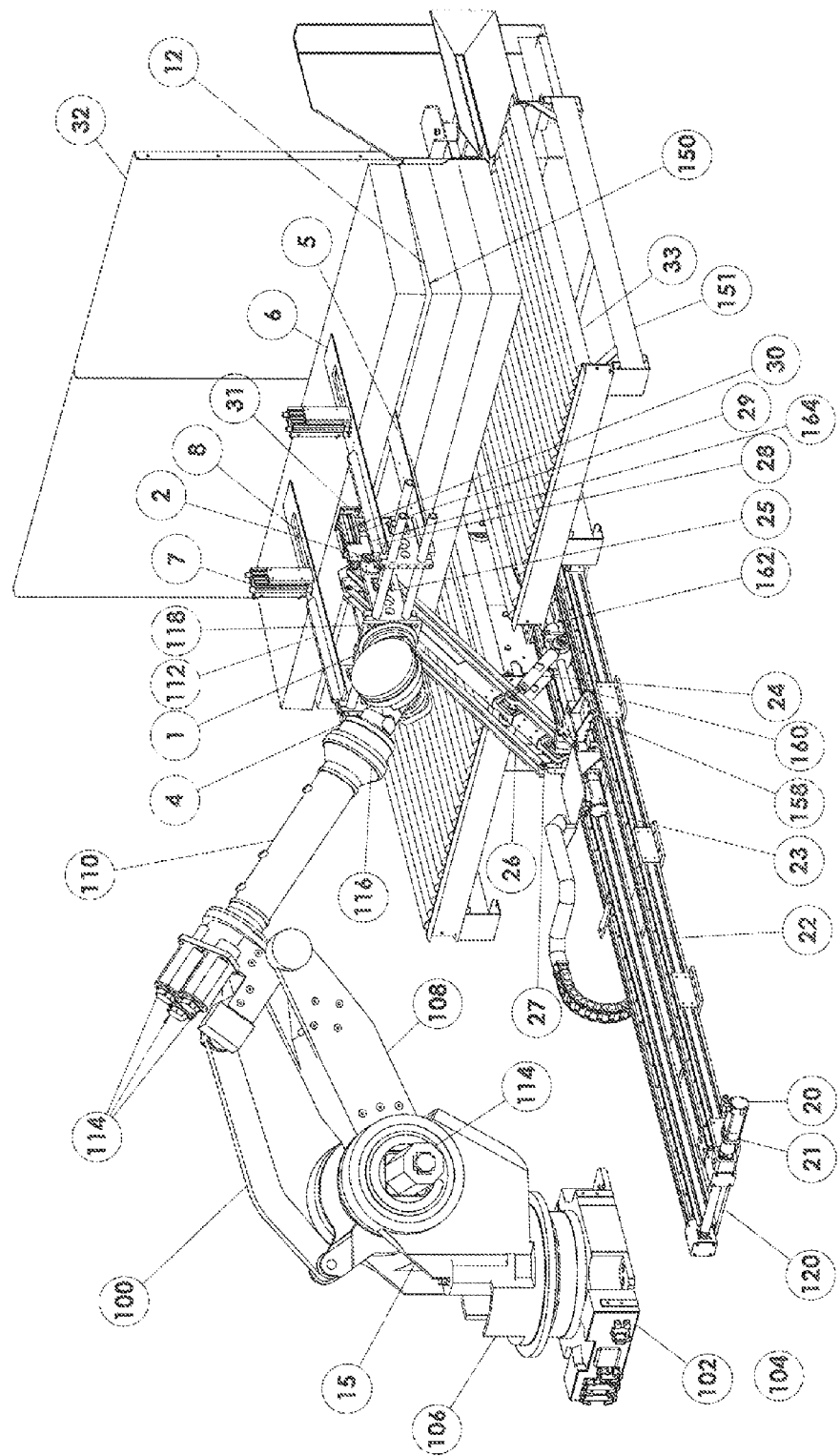
FIG. 10 is an isometric view of the lifting apparatus engaged with the stack section.

Subsequently the cylinder 29 is operated to elevate the housing 160 and separator plate 31, thereby forming a separation or gap 150 between adjacent items 12 in the stack at the desired location in the stack, as shown in FIG. 9. With the gap 150 formed between the desired number of items 12 and the remainder of the stack of items 12, the arm 15 can be operated to move the lower forks 5 into the gap 150 and the upper forks 6 over the top of the stack of items 12, as shown in FIG. 10. When the forks 5 and 6 are properly positioned with respect to the items 12 located therebetween, the air cylinders 7 on the upper forks 6 can be operated as described with regard to the first embodiment to secure the items 12 between the pads 8 and the lower forks 5.

Figure 11:
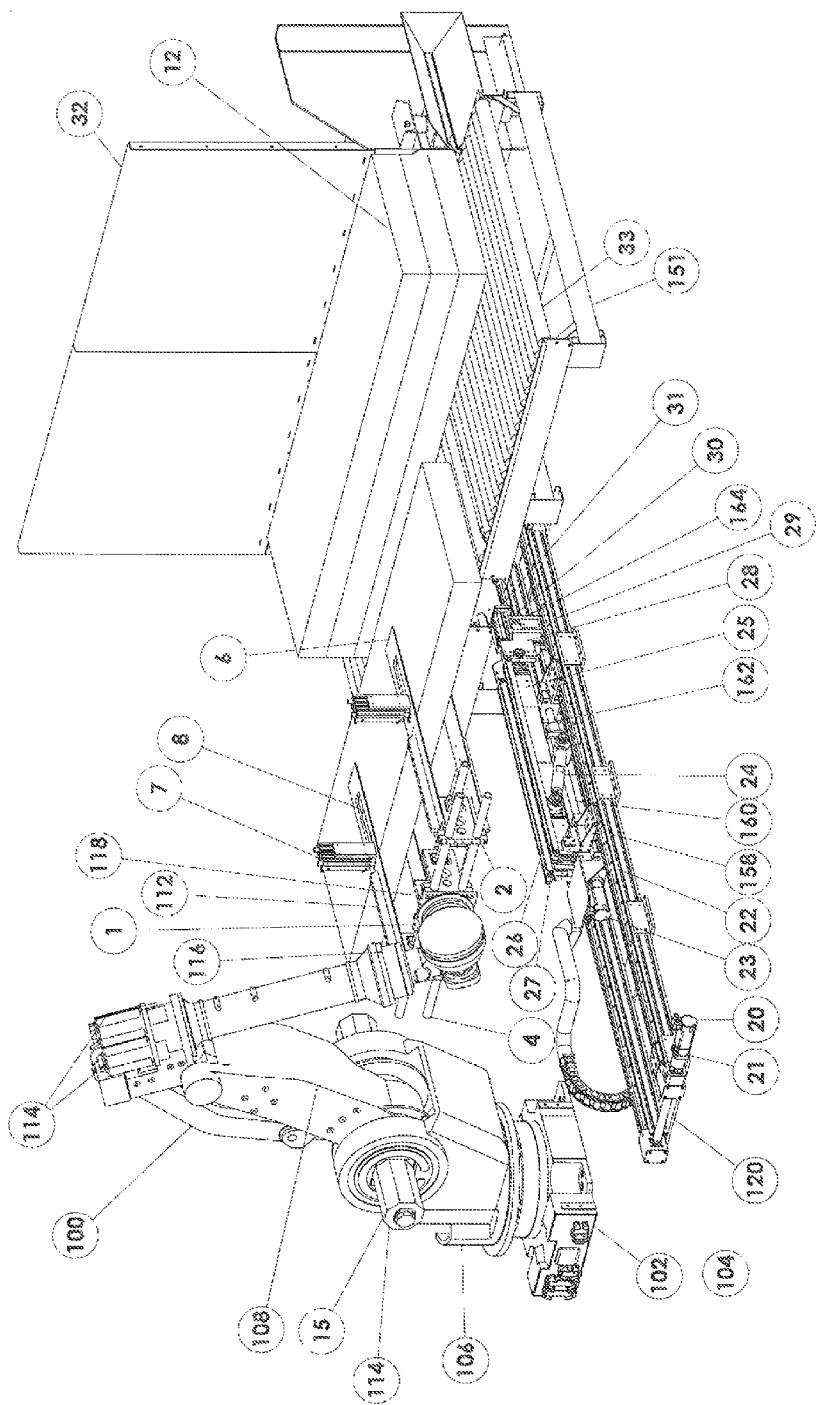
FIG. 11 is an isometric view of the lifting apparatus moving the stack section away from the stack.

At this point, the motor 20 and/or 23 can simultaneously or subsequently be operated to retract the plate 31 from the stack of items 12, thereby again preventing the mechanism 120' from interfering with the movement of the arm 15 as the arm 15 moves the items 12 away from the remainder of the stack as shown in FIG. 11.

With regard to either embodiment, the process for engaging and removing the desired number items 12 from the stack of items 12 can be continuously repeated to quickly and effectively separate and transfer the items 12 to a desired location.

In alternative embodiments, the tooling 112 can be formed with a single upper fork 6 and/or lower fork 5, or with more than two upper forks 6 and lower forks 5, depending upon the amount of stability required for the items 12 being separated and transported. Also, end of arm tooling or engagement mechanisms other than forks 5, 6 can also be utilized. Additionally, with regard to the manner of making the changes to accommodate different items 12 to be moved by the apparatus 100, the changes to the positioning of the pusher plate 11, separator plate 31 and forks 5 and 6 can be made by inputting the dimensions of the items 12 into a controller (not shown) for the apparatus 100, 100', such that the apparatus 100, 100' can quickly be reconfigured to accommodate changes in the size, shape or thickness of the items 12 without the need for making any significant and time-consuming changes in the tooling 112, 112' or the operating software for the apparatus 100, 100'.

The controller is operably connected to the apparatus 100, such as a pendant controller wired directly to the apparatus 100 or a computer/central processing unit connected to the various motors 20, 23, 114 and cylinders 7, 9, 29, 30 that control the movement of the various components of the apparatus 100, including the conveyors 33. The controller includes an input mechanism (not shown) through which an individual can provide various inputs and data to the controller for use in operating the apparatus 100. Some of these inputs that can be provided to the controller, and the corresponding functions of the controller for controlling the operation of the apparatus 100, 100' include:

1) Machine Pile Height (Inches): Height of product in the associated machine (not shown) being fed by the apparatus 100 that signals the apparatus 100 to feed the next section from the stack 12 to the machine.
2) Pick Stack Height (Inches): Height of the section of the stack 12 from top to bottom the separator mechanism 120,120' will separate and the tooling 112, 112' will pick.
3) Length X (Inches): The dimension of one corrugate sheet to be run that is through in orientation to the through direction of the machine being fed by the apparatus 100.
4) Width Y (Inches): The dimension of one corrugate sheet to be run that is side to side in orientation to the through direction of the machine being fed by the apparatus 100.
5) Thickness Z (Inches): Caliper or thickness of one corrugate sheet on the stack 12 to be run.
6) Number Of Stacks: The number of sections of the stack 12 that are in one stack 12 to be run.
7) Abort All: Ceases all programs from running and prevents any data from being entered into any data registers. (I.e. main program, sub programs, macros, etc. . . . )
8) End Cycle: Sends apparatus 100 to home position at the end of one cycle.
9) Start A1 Main: Starts the main program for the operation of the apparatus 100,100'.
10) Auto Home: Forces apparatus 100 to back up re-tracing its positions to a safe position (perch) and then move to home.
11) Flip Stack/Don't Flip Stack: Option to flip the section of the stack 12 held by the tooling 112, 112' from bottom to top or not to flip the section of the stack 12 being fed by the apparatus 100 to the machine.
12) Tamp Inbound/Don't Tamp Inbound: Option to push the stack 12 on the conveyors 33 in the pick area into the backstop 32 before separating and picking occur.
13) Hi/Lo: Height values from the top of the conveyor 33 up to various height locations or positions on the stack 12 corresponding to the heights of the sections of the stack 12 to be separated and removed. This range of values is capable of determining the presence of an area of damaged board/sheets in the stack 12, as the height will be out of the appropriate range. The apparatus 100, 100' will remove the number of damaged board s or sheets and place them in an area designated for damaged board or dunnage rather than feed it into the machine.

All of this information can be entered into the controller to affect the operation of the apparatus 100,100' to accommodate for changes to the types and/or sizes of the items in the stack 12 being acted upon by the apparatus 100, 100'.

Other alternative embodiments of the present disclosure are contemplated as being within the scope of the following claims which particularly point out and distinctly claim the subject matter regarded as the invention.

We claim:

1. An apparatus for separating a selected or predetermined number of items from a stack of the items, the apparatus comprising:
   a. a lift arm including at least one movable section;
   b. an engagement mechanism operably connected to one end of the movable section of the lift arm, the engagement mechanism configured to engage and move the items from the stack; and
   c. a separation mechanism selectively positionable adjacent the engagement mechanism and configured to engage and separate the items from the stack,
wherein the engagement mechanism comprises:
   at least one upper fork positionable above the items to be removed from the stack; and
   at least one lower fork positionable below the items to be removed from the stack, and wherein the separation mechanism is operably connected to the lift arm adjacent the engagement mechanism and further comprises:
  i. a track attached to the end of the lift arm between the at least one upper fork and the at least one lower fork; and
  ii. a carriage selectively movable along the track.

2. The apparatus of claim 1 wherein the at least one upper fork includes a clamp pad movably disposed on the upper fork to selectively engage the items between the clamp pad and the lower fork.

3. The apparatus of claim 1 wherein at least one of the upper fork or the lower fork is movable with respect to the other.

4. The apparatus of claim 1 further comprising a pusher plate connected to the carriage, the pusher plate engageable with a lowermost item to be removed to separate the lowermost item from the remaining items in the stack.

5. The apparatus of claim 4 wherein the pusher plate includes an outwardly extending projection engageable with the lowermost item.

6. The apparatus of claim 5 wherein the projection is pivotable with regard to the pusher plate.

7. The apparatus of claim 4 wherein the pusher plate is positionable on the lift arm outwardly of the at least one upper fork and the at least one lower fork.

8. The apparatus of claim 7 wherein the pusher plate has a height less than that of the section.

9. The apparatus of claim 1 wherein the engagement mechanism and the separation mechanism are rotatable with regard to the remainder of the lift arm.

10. The apparatus of claim 1 wherein the engagement mechanism and separation mechanism are invertable with regard to the remainder of the lift arm.

11. The apparatus of claim 1 further comprising a backstop located opposite the separation mechanism, wherein the separation mechanism is adapted to press the items to be separated from the stack against the backstop.

12. The apparatus of claim 11 wherein the backstop has a height greater than the height of the stack.

13. The apparatus of claim 11 further comprising at least one conveyor disposed between the lift arm and the backstop to move the stack into position against the backstop for engagement by the lift arm.

14. A method of separating a predetermined number of items from a stack of the items; the method comprising the steps of:
  a. providing an apparatus for separating a selected or predetermined number of items from a stack of the items comprising a lift arm including at least one movable section, an engagement mechanism operably connected to one end of the movable section of the lift arm, the engagement mechanism configured to engage and move the items from the stack and a separation mechanism selectively positionable adjacent the engagement mechanism and configured to engage and separate the items from the stack;
  b. engaging the separation mechanism with a section of a stack of items to be separated from the remainder of the stack;
  c. engaging the engagement mechanism with the section of items;
  d. disengaging the separation mechanism from the section; and
  e. moving the engagement mechanism and the section of items away from the remainder of the stack, wherein the separation mechanism is formed of a track attached to the end of the lift arm between at least one upper fork and at least one lower fork and a carriage selectively movable along the track, and wherein the step of engaging the separation mechanism with the section includes the steps of:
    i. moving the carriage along the track into engagement with the section; and
    ii. elevating the separation mechanism to lift and separate the section from the remainder of the stack.

15. The method of claim 14 wherein the separation mechanism includes a pusher plate disposed on the carriage that is disposed generally parallel to the stack, and wherein the step of moving the carriage into engagement with the section comprises pressing the pusher plate against the section.

16. The method of claim 14 wherein the step of engaging the engagement mechanism with the section comprises inserting at least one of the upper fork or the lower fork in a space between the section and the remainder of the stack formed by the engagement of the separation mechanism with the section.

17. The method of claim 14 wherein the step of moving the section away from the remainder of the stack comprises inverting the section.

\* \* \* \* \*